United States Patent [19]

Gorman et al.

[11] Patent Number: 5,073,600

[45] Date of Patent: * Dec. 17, 1991

[54] DISPERSANT VISCOSITY INDEX IMPROVERS

[75] Inventors: John Eugene Gorman, Houston; John A. Morris, Katy, both of Tex.

[73] Assignee: Shell Oil Company, Houston, Tex.

[ * ] Notice: The portion of the term of this patent subsequent to May 1, 2007 has been disclaimed.

[21] Appl. No.: 420,974

[22] Filed: Oct. 12, 1989

[51] Int. Cl.$^5$ .............. C10M 149/00; C10M 145/10; C08F 8/32

[52] U.S. Cl. .................................. 525/264; 525/244; 525/265; 525/285; 525/301; 525/327.6; 525/329.9; 524/531; 252/51.5 A

[58] Field of Search ............ 525/244, 264, 265, 285, 525/301, 327.6, 329.9; 524/531; 252/31.5 A

[56] References Cited

U.S. PATENT DOCUMENTS

| | | | |
|---|---|---|---|
| 4,020,036 | 4/1977 | South, Jr. | 260/40 R |
| 4,033,888 | 7/1977 | Kiovsky | 252/56 D |
| 4,077,893 | 3/1978 | Kiovsky | 252/56 R |
| 4,141,847 | 2/1979 | Kiovsky | 252/51.5 A |
| 4,145,298 | 3/1979 | Trepka | 252/51.5 A |
| 4,160,739 | 7/1979 | Stambaugh et al. | 252/56 D |
| 4,292,414 | 9/1981 | Saito et al. | 525/255 |
| 4,308,353 | 12/1981 | Saito et al. | 525/74 |
| 4,329,438 | 5/1982 | Yamori et al. | 525/64 |
| 4,427,828 | 1/1984 | Hergenrother et al. | 525/66 |
| 4,533,482 | 8/1985 | Bollinger | 252/56 R |
| 4,578,429 | 3/1986 | Gergen et al. | 525/291 |
| 4,628,072 | 12/1986 | Shiraki et al. | 525/57 |
| 4,632,769 | 12/1986 | Gutierrez et al. | 252/48.6 |
| 4,670,173 | 6/1987 | Hayashi et al. | 252/51.6 A |
| 4,749,505 | 6/1988 | Chung et al. | 252/56 R |
| 4,780,228 | 10/1988 | Gardiner et al. | 252/56 R |
| 4,803,003 | 2/1989 | Chung | 252/56 R |
| 4,822,508 | 4/1989 | Pennewiss et al. | 252/56 R |
| 4,921,625 | 5/1990 | Gorman | 525/301 |
| 5,693,838 | 9/1987 | Varma et al. | 252/51.5 R |

FOREIGN PATENT DOCUMENTS 0171167 2/1986 European Pat. Off. .

Primary Examiner—John C. Bleutge
Assistant Examiner—David Buttner
Attorney, Agent, or Firm—James O. Okorafor

[57] ABSTRACT

A process is provided according to the present invention comprising the steps of: functionalizing a base polymer by grafting alpha-beta unsaturated carboxylic acid, anhydride or ester to a base polymer, the base polymer being selected from the group of hydrogenated polymer of a conjugated diolefin and a copolymer of conjugated diolefins and monoalkenyl arenes, the grafting being performed in a blending device capable of imparting high mechanical energy and in the presence of 3 to 15 percent by weight, based on base polymer, of a suitable diluent oil; reacting the functionalized polymer with an amine; and recovering an animated polymer. This process results in a lower level of scission, crosslinking and coupling than processes which are essentially oil free. The product of this process is an excellent lubricating oil viscosity index improver and additionally has dispersant characteristics.

21 Claims, 1 Drawing Sheet

DISPERSANT VISCOSITY INDEX IMPROVERS

BACKGROUND OF THE INVENTION

This invention relates to an improved method of producing a lubricating oil viscosity index improver and dispersant and the product of this improved process. In another aspect, this invention relates to a lubricating oil comprising the product of the improved process.

Lubricating oil viscosity index improvers which have dispersant properties are known in the art, as taught by Kiovsky in U.S. Pat. No. 4,141,847. Kiovsky's viscosity index improver is prepared by reacting a selectively hydrogenated star-shaped polymer having at least four arms of polymers or copolymers of diolefins and monoalkenyl arenes with alpha-beta unsaturated carboxylic acid or acid derivative, and then reacting the resulting intermediate with an amine.

The process incorporated by Kiovsky to produce his viscosity index improver includes reacting the selectively hydrogenated star-shaped polymer with an alpha-beta unsaturated carboxylic acid or acid derivative at a temperature of between about 150° C. and about 300° C. for one to twenty hours, in a solvent containing 1% to 10% by weight polymer. The product of this functionalization reaction is then reacted with a $C_1$ to $C_{18}$ amine containing one to eight nitrogen atoms. Although the product of Kiovsky's process offered a significant advance in the art of lubricating oil additives, it has the disadvantage of requiring that large volumes of materials be held at high temperatures for extended reaction times. Separation of the product from the solvent is also required. This causes the operating costs for Kiovsky's process to be relatively high.

Attempts have been made to accomplish the functionalization of the base polymer in a more economical fashion by reacting the selectively hydrogenated polymer with the functional groups in an extruder. An example of such an attempt is Hayashi et al. U.S. Pat. No. 4,670,173. Hayashi reacts a hydrogenated block copolymer with an unsaturated carboxylic acid in the presence of a free radical initiator. The reaction is performed in either a solvent-free system or in a solution. The reaction may be carried out in any suitable vessel, device or apparatus, but is desirably performed in the absence of a solvent in an extruder, a Banbury, a two-roll mill, or the like. The product of the functionalization process is then reacted with a primary amine-containing compound in either a solvent, or in a solvent free system.

Hayashi also teaches that an optional and important aspect of his invention is that the blending device imparts high mechanical energy to such an extent that sufficient force is applied to the copolymer chains to cause scission or breakage thereof. This scission is said to be useful when the block copolymer is of higher molecular weight than that which is desired. As opposed to being an advantage. Applicant has found this scission to be a disadvantage. Further, applicant has found that in addition to scission, imparting high mechanical energy causes coupling and crosslinking of the base polymer causing a certain portion of the resultant functionalized polymer to have a significantly higher molecular weight than the initial polymer. Because of coupling, crosslinking and scission, the functionalized polymer produced by the reaction of the polymers and the functionalization agent upon imparting high mechanical energy has a broad molecular weight distribution. The rate at which polymers degrade while in service as a lubricating oil viscosity index improver is a strong function of the polymer's molecular weight with high molecular weight polymers degrading much more rapidly than lower molecular weight polymers. The "thickening effect" is also a strong function of molecular weight with high molecular weight polymers having a much greater effect on composition viscosity than low molecular weight polymers. A polymeric viscosity index improver with a broad molecular weight distribution will therefore lose thickening effect more rapidly as the polymer ages in service than a viscosity index improver with a narrow molecular weight distribution. It is therefore very desirable to have a viscosity index improver which has a narrow molecular weight range.

An advantage of Hayashi's process is that it may be carried out in a conventional extruder at a relatively high throughput when compared to solution functionalization processes. A process having this advantage, with a reduced level of scission, crosslinking and coupling is needed for the production of lubricating oil viscosity index improvers-dispersants.

It is therefore an objective of this invention to provide a process to produce a lubricating oil viscosity index improver-dispersant in which the resultant viscosity index improver-dispersant has a reduced level of scission, crosslinking and coupling.

SUMMARY OF THE INVENTION

A process is provided according to the present invention comprising the steps of: functionalizing a base polymer by grafting alpha-beta unsaturated carboxylic acid anhydride or ester to a base polymer, the base polymer being selected from the group of hydrogenated polymer of a conjugated diolefin and a copolymer of conjugated diolefins and monoalkenyl arenes, the grafting being performed in a blending device capable of imparting high mechanical energy and in the presence of 3 to 15 percent by weight, based on base polymer, of a suitable diluent oil; reacting the functionalized polymer with an amine; and recovering an aminated polymer. In another aspect, the product of this process is provided. In another aspect this invention relates to the use of the product of this process in a lubricating oil service.

DETAILED DESCRIPTION OF THE INVENTION

Figure 1:
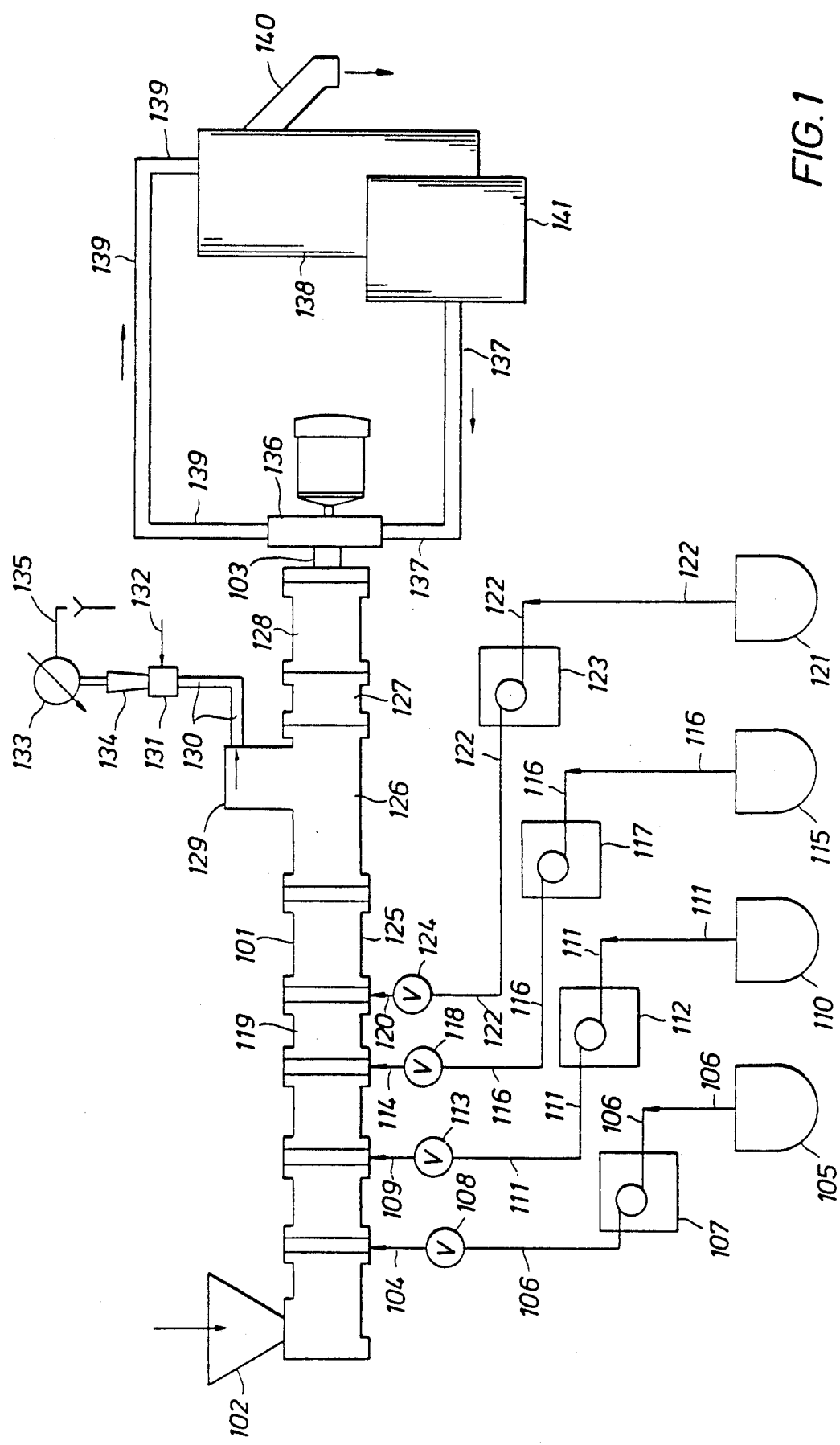
FIG. 1 is a schematic flow diagram of a functionalization and aminization process within the scope of the present invention.

The base polymers suitable for functionalization and amination by the process of this invention include homopolymers and copolymers of alphaolefins containing from 1 to about 10 carbon atoms, hydrogenated homopolymers and copolymers of diolefins containing from 4 to about 12 carbon atoms, hydrogenated copolymers of one or more conjugated diolefins and one or more monoalkenyl aromatic hydrocarbons containing from 8 to about 16 carbon atoms and the like. The base polymer may be of a star or linear structure. Hydrogenated polymers may be hydrogenated selectively, completely or partially. Hydrogenated polymers of conjugated diolefins and copolymers of conjugated diolefins and monoalkenyl arenes are preferably hydrogenated such that greater than 90% of the initial ethylenic unsaturation is removed by hydrogenation. Preferably, the hydrogenated polymers are substantially free of ethylenic unsaturation.

Selective hydrogenation refers to processes which hydrogenate a substantial portion of the ethylenic unsaturation and a substantial portion of the initial aromatic unsaturation is left unhydrogenated. As used herein, a hydrocarbon polymer substantially free of ethylenic unsaturation will be a hydrocarbon polymer containing, on average, less than about 10 carbon-carbon ethylenic double bonds per polymer chain. Polymers containing more than this amount of ethylenic unsaturation will, under certain conditions, exhibit excessive crosslinking during a functionalization reaction when the functionalization is completed in a blending apparatus capable of imparting high mechanical shear.

Useful hydrocarbon polymers include those prepared in bulk, suspension, solution or emulsion. As is well known, polymerization of monomers to produce hydrocarbon polymers may be accomplished using free-radical, cationic and anionic initiators or polymerization catalysts.

A wide range of molecular weight polymers can be utilized as the base polymer of the present invention. In general, the higher the molecular weight of the polymer, the less polymer will be required to achieve a given viscosity in a lubricating oil composition. The configuration of the polymer also effects the acceptable molecular weight. A base polymer of higher molecular weight will generally be acceptable if it is of a star configuration than if it were of a linear configuration. Also, the incorporation of monoalkenyl arene polymer blocks will reduce the maximum molecular weight.

In general, number average molecular weights of between about 500,000 and about 3,000,000 are acceptable, and between about 600,000 and about 2,000,000 are preferred, and between about 600,000 and about 1,200,000 are most preferred for the base polymer when the base polymer is a star-configuration hydrogenated polymer of one or more conjugated olefins or a star configuration polymer of one or more alpha olefins. For base polymers which are linear copolymers containing more than about 15% by weight of monoalkenyl arenes, number average molecular weights between about 80,000 and about 150,000 are acceptable, and between about 85,000 and about 110,000 are preferred. When the base polymer is a star configuration copolymer containing more than about 3% by weight of monoalkenyl arenes, the molecular weights is preferably between about 500,000 and about 1,500,000. When the base polymer is a copolymer of monoalkenyl arene and polymerized alpha olefins, hydrogenated polymerized diolefins or combinations thereof, the amount of monoalkenyl arene in the base polymer is preferably between about 15% and about 40% by weight of the base copolymer. The number average molecular weights, as used herein, refers to the number average molecular weight as measured by Gel Permeation Chromatograph ("GPC") with a polystyrene standard.

The minimum molecular weights preferred for functionalization and amination by the method of the present invention is also limited by the molecular weight necessary for the particular base polymer to be a solid at room temperature and atmospheric pressure. Normally liquid polymers; i.e., polymers which are liquid at standard temperature and pressure do not, generally, process well in blending equipment capable of imparting high mechanical energy such as an extruder. As a result, polymers having a molecular weight sufficiently high to be solid at standard temperatures and pressures will, generally, be used in the method of this invention. Moreover, it should be noted that chemical, thermal and shear degradation which occurs in the blending apparatus increases with increasing molecular weight of the polymer. The amount of degradation is significantly reduced with the method of this invention and, as a result, the method of this invention may be practiced with higher molecular weight polymers than has been practicable in the extruder processing of the prior art. Generally, however, the method of this invention will not be used with polymers having a sufficiently large molecular weight as to result in more than about 30% degradation of the polymer during the extruder grafting process.

Polymers which are acceptable as the base polymer of the present invention include the hydrogenated derivatives of homopolymers and copolymers such as are described in U.S. Pat. Nos. 3,135,716; 3,150,209; 3,496,154; 3,498,960; 4,145,298 and 4,238,202, which are incorporated herein by reference. In general, the polymers taught by these patents may be polymers of one or more conjugated dienes containing from 4 to about 12 carbon atoms such as 1,3-butadiene, isoprene, piperylene, methylpentadiene, phenylbutadiene, 3,4-dimethyl-1,3-hexadiene, 4,5-diethyl-1,3-octadiene and the like. Preferred conjugated diolefins are those containing 4 to 8 carbon atoms. Moreover, one or more of the hydrogen atoms in the conjugated diolefins may be substituted with halogen. The polymers taught by these patents may also be copolymers of one or more of the aforementioned conjugated diolefins and one or more other monomers. Other monomers which may be used include aryl-substituted olefins such as styrene, various alkyl-substituted styrenes, alkoxy-substituted styrenes, vinyl naphthalene, alkyl-substituted vinyl naphthalenes and the like. The polymers taught by these references which may be hydrogenated and which would then be useful in the method of the present invention include random polymers, tapered polymers and block copolymers.

Polymers useful in the method of the present invention also include hydrogenated and selectively hydrogenated derivatives of block copolymers such as are taught, for example, in U.S. Pat. Nos. 3,231,635; 3,265,765; 3,322,856 and 3,772,196, which are incorporated herein by reference. Polymers which are acceptable as the base polymer further include hydrogenated and selectively hydrogenated derivatives of star-shaped polymers such as are taught, for example, in U.S. Pat. Nos. 4,033,888; 4,077,893; 4,141,847; 4,391,949 and 4,444,953, which are incorporated herein by reference. Star-shaped polymers are alternatively referred to as radial polymers, and may also properly be called branched polymers.

Linear block copolymers which may be hydrogenated and then functionalized with the method of this invention may, generally, be represented by the following general formula:

$$A_z-(B-A)_y-B_x$$

wherein:
A is a polymeric block comprising predominantly monoalkenyl aromatic hydrocarbon monomer units;

B is a polymeric block comprising predominantly conjugated diolefin monomer units;

x and z are, independently, a number equal to 0 or 1; and y is a whole number ranging from 1 to about 15.

Radial polymers which may be hydrogenated and then functionalized with the method of this invention may be represented, generally, by the following general formula:

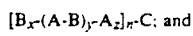

wherein:

A, B, x, y and z are as previously defined;

n is a number from 3 to 30;

C is the core of the radial polymer formed with a polyfunctional coupling agent;

B' is a polymeric block comprising predominantly conjugated diolefin units, which B' may be the same or different from B; and n' and n" are integers representing the number of each type of arm and the sum of n' and n" will be a number from 3 to 30.

As used herein in connection with polymer block composition, predominantly means that the specified monomer or monomer type which is the principle component in that polymer block is present in an amount of at least 85% by weight of the block.

Base polymers prepared with diolefins will contain ethylenic unsaturation, and such polymers will be hydrogenated prior to reacting the base polymers with an alpha-beta ethylenically unsaturated compound containing carboxyl or carboxyl derivative functionality in the process of this invention. When the polymer is hydrogenated, the hydrogenation may be accomplished using any of the techniques known in the prior art. For example, the hydrogenation may be accomplished such that both ethylenic and aromatic unsaturation is converted (saturated) using methods such as those taught, for example, in U.S. Pat. Nos. 3,113,986 and 3,700,633 which are incorporated herein by reference, or the hydrogenation may be accomplished selectively such that a significant portion of the ethylenic unsaturation is converted while little or no aromatic unsaturation is converted as taught, for example, in U.S. Pat. Nos. 3,634,595; 3,670,054; 3,700,633 and Re 27,145 which are incorporated herein by reference. Any of these methods could also be used to hydrogenate polymers which contain only ethylenic unsaturation and which are free of aromatic unsaturation.

In general any suitable liquid hydrocarbon may be used as a diluent for the polymer being modified in the method of this invention. A liquid hydrocarbon will be a suitable diluent if it is compatible with olefin or polyolefin polymers but not compatible with aromatic hydrocarbon polymers. Such a diluent would tend to swell the olefin monomer portion of the polymer without affecting the aromatic hydrocarbon monomer portion of the polymer when the polymer contains an aromatic portion. The liquid hydrocarbon may be a pure compound but generally will be a blend of compounds such as would be contained in a petroleum distillate fraction. It is, however, important that the diluent remain liquid throughout the processing. It is, therefore, important that the diluent have a boiling point above the maximum temperature that will be encountered during the processing steps. Preferably, the diluent will be a neutral petroleum distillate fraction boiling generally in the fuel oil and/or lubricating oil boiling ranges. Most preferably, the diluent will have a specific gravity of about 0.9, an ASTM IBP of about 710° F. and an ASTM 90% boiling point of about 865° F. Low aromatic and non-aromatic processing oils are generally preferred. Shellflex 371, a processing oil available from Shell Oil Company, Houston, Texas, is an example of a preferred processing oil.

The diluent oil is present in an amount between about 3% and about 15% by weight based on the base polymer. Preferably, the diluent oil is present in an amount between about 5% and 12% and most preferably between about 6% and 11% by weight. Lower amounts of diluent do not result in significant benefits over diluent-free processes. Higher levels of diluent result in lower efficiencies of the functionalization and amination reactions. Lower reaction efficiencies results in unreacted reactants being present in the product composition. These reactants are generally undesirable components in the product compositions. Higher amounts of diluent oil also needlessly dilute the finished product, resulting in high costs, higher volumes, more cold flow and more difficult handling without advantage.

Carboxyl or carboxyl derivative functionality is imparted into the base polymer by contacting the base polymer in an extruder with an $\alpha$-$\beta$ ethylenically unsaturated carboxylic acid reagent. Suitable $\alpha$-$\beta$ carboxylic acid reagents include the carboxylic acids per se and functional derivatives thereof such as anhydrides, esters, amides, imides, salts, acyl halides, nitriles and the like. The carboxylic acid reagent may be either monobasic or polybasic in nature. When the carboxylic acid reagent is polybasic, it is, preferably, dibasic, although tribasic and tetrabasic acids can be used. In general, the carboxylic acid reagent may be linear, branched, cyclic, substituted cyclic, aromatic, or substituted aromatic. In general, the acid portion of the carboxylic acid reagent will contain from 1 to about 12 carbon atoms. Useful monobasic alpha-beta unsaturated carboxylic acids include acrylic acid, methacrylic acid, cinnamic acid, crotonic acid, 2-phenylpropenoic acid and the like. Useful dibasic acids include maleic acid, fumaric acid, mesaconic acid, itaconic acid, citraconic acid and the like. Functional derivatives corresponding to each of the useful acids are well known in the art and their respective equivalents of the acid for purposes of functionalizing a polymer are taught, for example, in U.S. Pat. Nos. 4,578,429 and 4,670,173, incorporated herein by reference. Similarly, methods of making such functional derivatives are also well known to those of ordinary skill in the art. For example, ester derivatives useful in the method of this invention can be made by esterifying monohydric alcohols or epoxides with any of the aforedescribed acids. Corresponding amides can be prepared by pyrolyzing an ammonium salt of the acid or by reacting the corresponding ester, anhydride or acid halide with an amine. The corresponding anhydride can be prepared by dehydrating the acid. Corresponding imides can be prepared by pyrolyzing certain amides. The acid salts can be prepared, for example, by reacting the acid with a metal hydroxide. The corresponding acyl halides can be prepared by reacting the acid or its anhydride with a halogenation agent such as phosphorous tribromide, phosphorous pentachloride, thionylchloride and the like. The corresponding nitriles are generally prepared by dehydrolizing the corresponding amide.

In general, a sufficient amount of carboxylic acid reagent will be combined with the polymer to incorporate from about 1 to about 50 functional groups, on average, per polymer chain. In this regard, it should be noted that the reaction between the carboxylic acid reagent and the polymer frequently will not proceed to completion. As a result, the amount of carboxylic acid reagent actually used will, generally, exceed the amount which is desired to be grafted to the base polymer by from about 10 to about 50%.

Any of the free radical initiators known in the prior art to be effective in a grafting reaction of the type herein contemplated can be used as the free radical initiator in the method of this invention. Suitable free radical initiators include the various organic peroxides and hydroperoxides as well as the various organic azo compounds. Typical organic peroxides include benzoyl peroxide, t-butyl peroxypivalate, 2,4-dichlorobenzoyl peroxide, decanoylperoxide, propionyl peroxide, hydroxyheptyl peroxide, cyclohexanone peroxide, t-butylperbenzoate, dicumyl peroxide, lauroyl peroxide and the like. Typical hydroperoxides include t-butyl hydroperoxide and 2,5-dimethyl-2,5-di(butylperoxy)hexane. Typical organic azo initiators include 2,2-azobis(2-methylpropionitrile), 2,2-azobis(2-methylvaleronitrile), 4,4'-azobis(4-cyanovaleric acid) and the like. In general, the free radical initiator will be used in a concentration within the range from about 0.05 to about 0.50 wt % based on polymer. Particularly preferred free radical initiators include di t-butylperoxide; 1,1-bis(t-butylperoxy) 3,3,5-trimethylcyclohexane; t-butyl cumyl peroxide and 2,5-dimethyl-2,5-di(t-butylperoxy) hexane.

The polymer, diluent, carboxylic acid reagent and free radical initiator will be contacted at a temperature and pressure sufficient to insure that both the polymer and the carboxylic acid reagent are in the liquid or molten phase when the reaction occurs. The reactants will be contacted in a blending device capable of imparting high mechanical energy such as an extruder, a Banbury mixer, a sigma blade mixer and the like. These devices are referred to herein as extruders. Generally, sufficent mechanical energy, at the concentration of free radical initiator employed, will be imparted to cause at least a portion of the polymer chains to scission or break. The amount of polymer actually degraded is, however, significantly reduced in the method of this invention.

The modified polymer is then reacted with certain amines to form the oil-soluble product of the instant invention. The resulting imides and the like provide the dispersant function of the additive. Dispersant properties, as used herein, refers to the ability to maintain sludge in suspension in lubricating oil.

The amine employed in this invention can be branched or unbranched, saturated, aliphatic, primary or secondary amines containing 1 to 18 nitrogens, preferably a diamine, such as ethyl amine, butylamine, s-butylamine, diethylamine, etc., but including higher polyamines such as alkylene polyamines, wherein pairs of nitrogen atoms are joined by alkylene groups of 2 to 4 carbon atoms where one or more of the amine groups have one or more alkyl groups on the nitrogen atom. Preferred polyamines are of the formula:

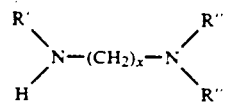

where
x is 2 to 4
R' is hydrogen or an alkyl group comprising 1 to 12 carbon atoms
R" are independently selected alkyl groups comprising 1 to 12 carbon atoms. Examples of such preferred polyamines include N-aminoalkyl piperazines, e.g., N-(2-aminoethyl) piperazine. Particularly preferred polyamines include diethylaminopropylamine, dimethylaminopropylamine, dibutylaminopropylamine, dipropylaminopropylamine, dipentylaminopropylamine, dimethylaminoethylamine, dibutylaminoethylamine, dipropylaminoethylamine, dipentylaminoethylamine, N,N-dimethylaminopropyl, N'-methylamine, N,N-dimethylaminopropyl, N'-ethylamine, N,N-dimethylaminoethyl, N'-methylamine, and N,N'-diethylaminoethyl, N'-ethylamine.

The molar ratio of amine to carboxylic moiety grafted to the base polymer is typically between about 0.1:1 and about 2:1, preferably between about 0.5:1 and about 1.5:1, most preferably about 1:1. Amidization is typically performed at a temperature of between about 150° C. and about 250° C. for between about 15 seconds and about 3.0 minutes.

The amount of amine incorporated in the viscosity index improver dispersant is preferably at least, on the average, one amine group per polymer molecule and less than that required to result in a polymer containing about 2.0% by weight nitrogen content. Most preferably, the aminated polymer contains less than about 0.5% by weight nitrogen. The maximum amount of amine is beneficially incorporated in the viscosity index improver-dispersant is limited by the tendency of the polymer to attach itself to too many particles, and itself act like a sludge.

In both reaction steps of functionalization and amination it is much preferred that the reactions take place in the absence of oxygen. A nitrogen blanket is often used to accomplish this result. The reason for performing the reaction in the absence of oxygen is that the resulting additive may be more oxidatively unstable if any oxygen is present during the formation of the additive.

If excess amine is employed, then it may be desirable to remove the excess from the reaction product. The excess amine may be removed in the extruder by applying a vacuum or with a stripping gas stream, which is subsequently vented from the extruder in a specially designed vent section.

An embodiment of the invention wherein an extruder is used as the blending apparatus is illustrated in FIG. 1. Referring to FIG. 1, a solid, particulate polymer feed is fed to extruder 101 through feed hopper 102. In the extruder, the polymer is heated at least to a temperature at which the polymer becomes molten so that the reaction of the polymer and the carboxylic acid reagent will occur when the polymer is in the molten phase. As is well known, extruders generally contain a plurality of stages and both the temperature and channel depth of the screw may be varied in each of the stages. In general, and in the method of this invention, the temperature may range from about 160° to about 250° C., depending upon the particular base polymer being processed, while the reaction between the base polymer and the carboxylic acid reagent takes place. Variation of the temperature in the different stages of the extruder is not necessary to the method of this invention and the temperature will therefore be maintained as nearly constant as possible as the polymer passes through the extruder except that the temperature in the inlet zone, i.e., the zone or zones where the feed materials are introduced may, generally, be maintained somewhat below the reaction zone temperature to maximize the life of the free radical initiator thereby improving grafting efficiency. Also in the extruder, the polymer feed is transported from the feed inlet 102 to the extruder outlet 103 with one or more extruder screws not illustrated. In general, the channel depth may be varied within the range from about 0.0005 to about 0.5 times the diameter of the screw housing with maximum depths occurring in those areas where the components are reacted and then again at or near the outlet of the extruder where the melt is devolatilized. In transition, the channel depth may be varied to insure that the desired degree of mechanical shear and mixing have been imparted on the materials being processed.

As the base polymer passes through the blending apparatus, the extruder in the embodiment illustrated in FIG. 1, the base polymer first will be combined with a suitable diluent introduced into the extruder through line 104. The diluent is supplied from a suitable vessel 105 through lines 106—106 with pump 107. The amount of diluent actually introduced into the extruder may be controlled with valve means 108. In general, the amount of diluent introduced will range from about 3 to about 15 wt % based on the amount of base polymer feed to the extruder. Introduction of the diluent into the extruder before the carboxylic acid reagent or the free radical initiator is important to the method of this invention since the solvent or diluent is effective in reducing the amount of scission or degradation of the polymer. Additionally, the solvent or diluent is effective in reducing the amount of crosslinking or coupling that would otherwise occur. While the inventors do not wish to be bound by any particular theory, it is believed that the diluent effectively reduces degradation as a result of interaction between the diluent and that portion of the polymer where the grafting reaction occurs by reducing the melt temperature of the polymer and effectively reduces crosslinking or coupling by capping free radical sites on the polymer that might otherwise combine. Generally, the diluent will be introduced to the blending apparatus at a point within the range from about 1 D to about 6 D downstream from the point at which the polymer is fed into the extruder-D being the inside diameter of the housing of the blending apparatus, in the embodiment illustrated in the Figure.

As the base polymer feed and diluent continue through the extruder, they are next contacted either with a carboxylic acid reagent or a free radical initiator. In the embodiment illustrated, the polymer and diluent are next contacted with the carboxylic acid reagent. Adding of the carboxylic acid reagent prior to adding the free radical initiator is preferred since it has been discovered that addition of the free radical initiator prior to the carboxylic acid reagent will, generally, result in an increased amount of crosslinked or coupled polymer in the product recovered from the blending apparatus. In the embodiment illustrated, the carboxylic acid reagent is introduced into the extruder through line 109. The carboxylic acid reagent is supplied from a suitable storage vessel 110 through lines 111—111 with pump 112. The amount of carboxylic acid reagent introduced into the blending apparatus may be controlled with suitable valve means 113. In general, the carboxylic acid reagent could be fed to the blending apparatus as a solid, as a liquid or as a solution in a suitable solvent. With respect to feeding as a liquid, it should be noted that certain of the carboxylic acid reagents heretofore noted as operable are normally liquid. Those which are solid, however, could be heated and fed in the molten phase. In general, carboxylic acid reagent will be introduced into the blending apparatus at a concentration sufficient to incorporate from about 1 to about 50 moles of carboxylic acid reagent, on average, per mole of polymer. As indicated supra, the amount of carboxylic acid reagent introduced into the blending apparatus will, generally, be from about 10 to about 50% more than that required for stoichiometric addition of the carboxylic acid reagent in the amount desired. In general, the carboxylic acid reagent will be introduced into the extruder at a point downstream of the point where the diluent is introduced and within the range from about 1 D to about 8 D downstream of the point where the polymer feed is introduced to the extruder-D being the diameter of the housing for the blending apparatus, in the embodiment illustrated, the screw housing of the extruder. In general, the temperature in the blending apparatus at the point at which the carboxylic acid reagent is introduced is not critical to the method of the present invention. For reasons more fully explained below, the polymer will, preferably, be at a temperature below about 210° C. when the carboxylic acid reagent is introduced.

As the polymer, diluent and, in the embodiment illustrated, the carboxylic acid reagent continue to move through the blending apparatus, the blend is next contacted with a free radical initiator introduced into the extruder through line 114. The free radical initiator is fed from a suitable storage vessel 115 through lines 116—116 with pump 117. The amount of free radical initiator actually introduced into the extruder may be controlled with a suitable valve means 118. The free radical initiator may be fed to the blending apparatus in its natural state; i.e., as a liquid or a solid, or as a solution. Most of the free radical initiators contemplated for use in the method of the present invention are normally liquid and will, generally, be introduced into the extruder in this state. As is well known in the prior art, free radical initiators such as those contemplated for use herein generally have a very short half life at elevated temperatures and frequently even decomposed at temperatures within the range of those contemplated for use herein. As a result, it is important to the method of the present invention to introduce the free radical initiator into the blending apparatus at as low a temperature as reasonably practicable and then relatively quickly thereafter bringing the temperature of the entire blend up to the desired reaction temperature so as to insure maximum efficiency during the grafting reaction. In this regard, maximum reaction efficiency is generally realized when the temperature of the blend with which the free radical initiator is initially contacted is within the range from about 160° to about 210° C. As a result, and as indicated supra, the initial stages of the blending apparatus will be maintained at a temperature within this range so as to insure maximum reaction efficiency. The temperature, will, however, be raised to the desired reaction temperature, as quickly after the free radical initiator is added as is practicable. The free radical initiator will be added at a point downstream of the point where the diluent is introduced and within the range from about 5 D to about 16 D from the point at which the polymer is introduced into the blending apparatus where D is the diameter of the housing for the blender or, as in the embodiment illustrated, the housing of the screw or screws in the extruder.

As indicated supra, the channel depth of the extruder screw or screws will, generally, be at or near a maximum in that portion of the apparatus immediately after which the polymer feed is introduced. In fact, this maximum dimension will, generally, be maintained until both the diluent and the carboxylic acid reagent are introduced. The channel depth will, generally, be reduced in one or more steps prior to addition of the free radical initiator and then will be further reduced after the free radical initiator is introduced. Generally, the channel depth will again begin to increase after the grafting reaction has been completed reaching a second maximum or near maximum to facilitate devolatization at or near the blending apparatus exit. The channel depth will, of course, generally vary somewhat during the reaction stages-such variation being well known and appreciated in the extruder processing arts. The zone 119 within which the grafting reaction occurs will have a length within the range from about 1 D to about 6 D, D being the diameter of the housing as previously defined.

As the polymer with the carboxylic acid functionality grafted to it, diluent, and free radical initiator continue to move through the blending apparatus, the blend is next contacted with an amine. The amine is introduced into the extruder through line 120. The amine is fed from a suitable storage vessel, 121, through lines 122—122 with pump 123. The amount of amine actually introduced into the extruder may be controlled with a suitable valve means 124. The amine may be fed into the blending apparatus in its natural state; i.e., as a liquid or a solid, or as a solution. The amine could also be diluted with a diluent such as a lubricating oil, or a white mineral oil to aid in lubrication of the pump, 123.

The reaction between the amine and the acid functionality which is grafted onto the polymer occurs within a reaction zone, 125.

As indicated supra, the channel depth in the blending apparatus will, generally, be varied after the grafting reaction is completed as the modified polymer passes from the reaction zone 125 to the blending apparatus outlet 103. Generally, the first such variation in channel depth will be accomplished prior to devolatization of excess reactants and in the embodiment illustrated in FIG. 1 the first such change occurs in zone 126. The second such variation will be made to facilitate pelletization in zone 127 and/or zone 128. It will, of course, be appreciated that changes in channel depth can readily be accomplished, when an extruder is used as the blending apparatus, by changing the screw or screws configuration. Similarly, when other types of blending apparatus are used such changes can be easily accomplished by changing the blender or agitator configuration.

The effluent from the reaction zone will contain unreacted carboxylic acid reagent and unreacted amine when the grafting reaction and the amination reaction do not proceed to completion. Because many of the carboxylic acid reagents and amines useful in the method of this invention may be detrimental to a lubricating oil viscosity index improver if allowed to remain in the polymer product in an ungrafted state, at least a portion of the unreacted carboxylic acid reagent and amine should be separated from the polymer product prior to use. In general, any of the conventional techniques known in the prior art such as stripping, extraction and the like may be used. Frequently, however, a portion of the unreacted carboxylic acid reagent may be separated from the graft reaction zone effluent simply by venting the effluent after the grafting reaction is completed. In the embodiment illustrated in the Figure, a vent 129 is provided in the first zone 126 after the grafting zone for this purpose. In the embodiment illustrated, the vapors passing through vent 129 are passed through lines 130—130 to a steam eductor 131 where the vapors are combined with steam introduced through line 132. The steam eductor will pull a vacuum on the vent. In general, the vent outlet pressure should be within the range from about 20 to about 300 torr. The vapor-steam mixture is then passed to a condenser 133 through line 134 where the steam vapor mixture is condensed and recovered as a liquid through line 135. Other methods of recovering or disposing of the vapor are known in the prior art and could also be utilized. The vapor will contain in addition to unreacted carboxylic acid reagent, free radical initiator decomposition products, unreacted amines, low molecular weight polymer formed as a result of degradation and the like. In general, venting of the grafting reactor effluent will remove from about 20 to about 80% of the unreacted carboxylic acid reagent and unreacted amines contained in the effluent. The temperature in the zone where the effluent is vented could, of course, be increased to increase the vapor pressure of the components to be vented.

The lubricating oil viscosity improver-dispersant product will be recovered as a pellet and any of the suitable recovery means known in the prior art may be used for this purpose. In the embodiment illustrated in FIG. 1, an underwater pelletizer with a tempered water system is shown. Referring again to FIG. 1, the functionalized polymer exits the blending apparatus 101 through a suitable outlet 103 and is introduced into the underwater pelletizer at 136 where it is combined with water circulating through lines 137—137. In the embodiment illustrated in FIG. 1, the polymer water mixture is then passed to spin dryer 138 through lines 139—139. In the spin dryer the polymer pellets are generally dried to a water content within the range from about 100 to about 500 ppm, based on polymer, and then recovered through line 140. Water separated from the polymer pellets may then be returned to a slurry water bath 141 through lines not illustrated from where it may then be recirculated through lines 137—137. Makeup water may be added to the slurry water bath 141 as required using means not illustrated. In those cases where a lower water content would be required, other drying means could be employed. Also, to the extent that the content of unreacted carboxylic acid reagent in the recovered product is higher than desired for the lubricating oil viscosity index improver-dispersant, the recovered polymer could be further processed using techniques well known in the prior art to further reduce the content of unreacted carboxylic acid reagent.

The process of the present invention has the desirable feature of being operable in standard polymer handling equipment. Further, the residence time of the process is only about 15 seconds to about 3 minutes. This is a distinct advantage over prior art solution functionalization and amination processes. The process results in significantly lower levels of scission, crosslinking and coupling, than prior art extrusion functionalization and amination methods. The product of the present process therefore has a narrower molecular weight distribution than products of prior art extrusion methods. The narrower molecular weight distribution minimizes the rate of degradation of the polymer in lubricating oil service, and therefore maximizes the retention of the "thickening" effect of the polymer. This advantage is evidenced by lower shear loss or DIN loss. The product of the present process also has excellent viscosity index improving properties and excellent dispersant characteristics.

EXAMPLES

A hydrogenated isoprene-styrene diblock copolymer was used in the examples which was 36% by weight styrene and had a molecular weight of about 93,000. Hydrogenation had reduced the ethylenic unsaturation to less than 1.0% of the original ethylenic unsaturation.

A low molecular weight star polymer was used in the example which was a hydrogenated homopolymer of polyisoprene with an average of about 15 arms per molecule, and having arms with a number average molecular weight of about 35,000 each. Hydrogenation had reduced the unsaturation to less than 1.0% of the initial unsaturation.

A high molecular weight star polymer was used which was a hydrogenated homopolymer of polyisoprene with an average of about 15 arms per molecule, and with a number average molecular weight of each arm of about 65,000. Hydrogenation had reduced the unsaturation to less than 1.0% of the initial unsaturation.

Diethylaminopropylamine ("DAP") was the amine used in all of the examples. The alpha-beta unsaturated carboxyl acid used was maleic anhydride ("MA"). A 67% by weight solution of MA in acetone was used. The diluent oil used was an HVI-100 neutral oil.

The peroxide utilized as the free-radical initiator in these examples was 2,5-dimethyl-2,5-bis (tertbutyl peroxy) hexane which is available under the trade name Lupersol 101 from Lucidol Pennwalt Chemicals. The peroxide was utilized as 50% by weight solution in HVI-100 neutral oil.

A two inch Welding Engineering Inc. extruder was used to prepare the example compositions. The extruder was a non-intermeshing twin screw extruder with a single vent and an underwater face cutter. The feed rate for each run was 100 lb/hr and the screw speed was 120 rpm. Polymer was fed to the extruder using a Conair feeder with a variable speed auger. Peroxide was injected 12 diameters downstream of the feed port, and MA was injected 6 diameters downstream of the feed port. Dilution oil, when it was utilized, was also injected 6 diameters downstream of the feed port. The amine solution was injected about 17 diameters downstream of the feed port.

An air-driven William's pneumatic plunger pump was used to inject the amine solution for the examples incorporating the diblock copolymer and the high molecular weight star polymer. A Zenith-Nichols gear pump, Model BPB-4391-1.168 was used to inject the amine solution in the preparation of the compositions containing the low molecular weight star-shaped polymer. The gear pump is preferred because use of the pneumatic plunger pump resulted in surges in the feed rate whereas the gear pump did not. The gear pump required that the amine be diluted to a 50% by weight solution in mineral oil to lubricate the pump.

The devolatilization port was operated between about 50 to about 150 torr.

The product was pelletized using a Gala underwater pelletization system. Pellets were recovered in trays from a spin dryer.

In the following examples GPC analyses were performed on the aminated polymers.

Maleated polymers were analyzed by hot press, IR techniques. For star-shaped polymers, a spike of a hydrogenated styrene-styrene triblock copolymer was added as a reference peak.

Bound amine was determined by a hot press infrared technique similar to that used for maleic anhydride analysis.

Total nitrogen was determined by coulometric analysis.

Hydrogenated Diblock

The hydrogenated diblock copolymer of isoprene and styrene was aminated in the Welding Engineering extruder described above, using the amounts of peroxide, oil, MA and amine listed in Table 1. The amounts are in percent weights based on the amount of base polymer. The total degradation, and degradation to high molecular weight polymer was measured and is also included in Table 1. This example demonstrates significant decreases in degradation when diluent oil is present during the functionalization process.

TABLE 1

| | Hydrogenated Isoprene-Styrene Diblock Copolymer | | | | | | | |
|---|---|---|---|---|---|---|---|---|
| | | | | DAP | DAP | Total | Degradation | |
| | Peroxide | Oil | MA | Added | Bound | Nitrogen | Total | HMP |
| Composition | % w | % w | % w | % w | % w | % w | % w | % w |
| 1 | 0.15 | 10 | 1.6 | 2.1 | 1.0 | 0.18 | 27 | 6.5 |
| C1 | 0.15 | 0 | 1.6 | 2.1 | 1.4 | 0.11 | 38 | 7.0 |
| 2 | 0.25 | 10 | 1.6 | 1.8 | 1.6 | 0.43 | 35 | 9.8 |
| C2 | 0.25 | 0 | 1.6 | 1.8 | 1.5 | 0.43 | 46 | 11.5 |

Low Molecular Weight Star Polymer

The hydrogenated star-shaped polyisoprene polymer was functionalized with MA, using initiator Lupersol 101, and reacted with DAP in the Welding Engineering extruder as described above. The amounts of the components, and the measured degradation are listed in Table 2. The low molecular weight star-shaped polymer has a low viscosity and cold flows easily. It is therefore obtained in bales. The bales were chopped into 0.5 inch strips and then granulated to produce chips. These chips were then dusted with 5–10% w of crumbs of the hydrogenated diblock isoprene-styrene copolymer used in compositions 1, 2, C1 and C2. The dusted chips were then stored in a refrigerator at between 10° and 20° F. until they were functionalized.

TABLE 2

| | Low Molecular Weight Star-Shaped Polymer | | | | | | | |
|---|---|---|---|---|---|---|---|---|
| | | | | DAP | DAP | Total | Degradation | |
| | Peroxide | Oil | MA | Added | Bound | Nitrogen | Total | HMP |
| Composition | % w | % w | % w | % w | % w | % w | % w | % w |
| 3 | 0.15 | 8 | 2.0 | 3.0 | 1.3 | 0.61 | 11 | 4 |
| C3 | 0.15 | 0 | 2.0 | 3.0 | 1.6 | 0.57 | 26 | 11 |
| 4 | 0.15 | 8 | 1.5 | 2.4 | 0.6 | 0.43 | 14 | 6 |
| C4 | 0.15 | 0 | 1.5 | 2.4 | 1.3 | 0.46 | 27 | 12 |
| 5 | 0.10 | 8 | 1.4 | 1.8 | 0.9 | 0.38 | 12 | 7 |
| C5 | 0.10 | 0 | 1.4 | 1.8 | 1.7 | 0.40 | 26 | 6 |

This example demonstrates a significant impact of the presence of 8% by weight of the diluent oil on the degradation of the polymer.

High Molecular weight Star-Shaped Polymer

Table 3 summarizes the composition and properties of Compositions 6 and C6, in which the base polymer is the high molecular weight star-shaped polymer.

The HMP for the high molecular weight polymer could not be determined by the modified GPC methods due to poor resolution with polymers of this high molecular weights.

Again, it can be seen that the presence of diluent oil has a significant impact on the extent of degradation.

TABLE 3

| | High Molecular Weight Star-Shaped Polymer | | | | | | |
|---|---|---|---|---|---|---|---|
| Composition | Peroxide % w | Oil % w | MA % w | DAP Added % w | DAP Bound % w | Total Nitrogen % w | Degradation % w |
| 6 | 0.17 | 10 | 2.0 | 3.0 | 2.3 | 0.6 | 22 |
| C6 | 0.17 | 0 | 2.0 | 3.0 | 2.3 | 0.6 | 37 |

Shear Loss Example

The effect of the present invention on shear loss ("DIN loss") was determined in this example. The low molecular weight star-shaped base polymer described above was aminated utilizing varying amounts of diluent oil, peroxide, MA and DAP, according to Table 4. The Welding Engineering extruder described above was utilized as was the process described above. Comparative Compositions C7 and C8 were prepared without diluent oil, and Comparative Composition C9 was prepared using 2% by weight, based on the base polymer, of diluent oil. Compositions 7, 8 and 9 were prepared using 6% by weight diluent oil and composition 10, 11 and 12 were prepared using 10% by weight diluent oil. The DIN losses were measured on a Kurt Orbahn Diesel Injector Test according to ASTM D3945-86.

It can be seen from Table 4 that the process of the present invention results in DIN losses of less than 15% by weight. In the preferred embodiment of about 10% diluent oil the DIN loss was less than 12% by weight. Prior art extrusion amination resulted in DIN losses of greater than 16% by weight.

TABLE 4

| Composition | Oil Level % w | DIN Loss % w | Peroxide % w | MA Added % w | DAP Added % w | Total Nitrogen % w |
|---|---|---|---|---|---|---|
| C7 | 0 | 20.2 | 0.15 | 1.5 | 1.7 | 0.36 |
| C8 | 0 | 16.3 | 0.10 | 1.4 | 1.8 | 0.40 |
| C9 | 2 | 17.7 | 0.10 | 1.1 | 1.5 | 0.35 |
| 7 | 6 | 13.8 | 0.10 | 1.5 | 1.8 | 0.42 |
| 8 | 6 | 11.0 | 0.10 | 1.1 | 1.5 | 0.38 |
| 9 | 6 | 10.9 | 0.10 | 1.1 | 1.5 | 0.37 |
| 10 | 10 | 9.2 | 0.10 | 1.4 | 1.8 | 0.38 |
| 11 | 10 | 11.9 | 0.10 | 1.1 | 1.5 | 0.39 |
| 12 | 10 | 9.3 | 0.10 | 1.1 | 1.5 | 0.38 |

We claim:

1. A process to produce an aminated polymer comprising the steps of:
   (a) producing a functionalized polymer by grafting an alpha-beta unsaturated carboxylic moiety selected from the group consisting of acids, anhydride and ester, to a base polymer selected from the group consisting of (i) selectively hydrogenated block copolymer consisting essentially of one or more blocks comprising predominantly conjugated diolefin monomer units, and one or more block comprising predominantly monoalkenyl arene monomer units, and (ii) hydrogenated polymers consisting essentially of conjugated diolefin monomer units, where the functionalization is performed in a device capable of imparting high mechanical energy and is performed in the presence of between about 3.0% and about 15% by weight based on the amount of base polymer of a diluent oil;
   (b) reacting the functionalized polymer with an amine to form an aminated polymer; and
   (c) recovering the aminated polymer.

2. The process of claim 1 wherein the device capable of imparting high mechanical energy is selected from the group consisting of Banbury mixer, and sigma blade mixer.

3. The process of claim 1 wherein the functionalization is performed in the presence of a free radical initiator.

4. The process of claim 3 wherein the free radical initiator is selected from the group consisting of 2,5-dimethyl-2,5-bis(tert butylperoxy) hexane, ethyl 3,3-di(-tertbutyl peroxy) cyclohexane, ditertbutyl peroxide, tert butylcumyl peroxide, and 1,1-bis(tert butyl peroxy)3,3,5-trimethylcyclo-hexane.

5. The process of claim 1 wherein the amine is diethylaminopropylamine.

6. The process of claim 1 wherein the base polymer is a selectively hydrogenated linear block copolymer containing at least one block comprising predominantly conjugated diolefin monomer units and at least one block comprising predominantly monoalkenyl arene monomer units, the base polymer having a monoalkenyl arene content of between about 15% and about 40% by weight, a number average molecular weight between about 80,000 and about 150,000 as measured by GPC with a polystyrene standard wherein the ethylenic unsaturation of the base polymer has been reduced to less than 20% of the original ethylenic unsaturation by hydrogenation.

7. The process of claim 6 wherein the conjugated diene is isoprene.

8. The process of claim 7 wherein the monoalkenyl arene is styrene.

9. The process of claim 8 wherein the selectively hydrogenated linear block copolymer is a diblock copolymer.

10. The process of claim 1 wherein the base polymer is of a star configuration.

11. The process of claim 10 wherein the star configuration base polymer is a hydrogenated homopolymer of a conjugated diolefin wherein the unsaturation has been reduced to less than 20% of the original unsaturation by hydrogenation.

12. The process of claim 11 wherein the conjugated diolefin is isoprene and the number average molecular weight of the arms of the base polymer is between about 30,000 and about 75,000 as measured by GPC with a polystyrene standard.

13. The process of claim 1 wherein the alpha-beta unsaturated carboxylic moiety is an acid.

14. The process of claim 1 wherein the alpha-beta unsaturated carboxylic moiety is maleic anhydride.

15. The process of claim 1 wherein the diluent oil is present in an from about 6% to about 11% by weight based on the base polymer.

16. The process of claim 1 wherein the device capable of imparting high mechanical energy is an extruder.

17. The process of claim 1 wherein the molar ratio of amine to carboxylic moiety is between about 0.1:1.0 and about 2.0:1.0.

18. The process of claim 1 wherein the molar ratio of amine to carboxylic moiety is between about 0.5:1.0 and about 2.0:1.0.

19. The process of claim 1 wherein the molar ratio of amine to carboxylic moiety is about 1.0:1.0.

20. The process of claim 1 wherein the amount of alpha-beta unsaturated carboxylic moiety is sufficient to result in at least on the average one carboxylic functional group per polymer molecule and not more than 5% by weight carboxylic functional groups as percent by weight of the base polymer.

21. The process of claim 1 wherein the amount of amine is sufficient to result in at least on the average one amine group per polymer molecule and not more than 2.0% by weight nitrogen in the aminated polymer.

* * * * *